(12) United States Patent
Ogino

(10) Patent No.: US 11,555,560 B2
(45) Date of Patent: Jan. 17, 2023

(54) HOLDING DEVICE CONNECTING STRUCTURES

(71) Applicant: DAIWA KASEI KOGYO KABUSHIKI KAISHA, Okazaki (JP)

(72) Inventor: Tetsuya Ogino, Okazaki (JP)

(73) Assignee: DAIWA KASEI KOGYO KABUSHIKI KAISHA, Okazaki (JP)

( * ) Notice: Subject to any disclaimer, the term of this patent is extended or adjusted under 35 U.S.C. 154(b) by 0 days.

(21) Appl. No.: 17/496,679

(22) Filed: Oct. 7, 2021

(65) Prior Publication Data

US 2022/0136620 A1 May 5, 2022

(30) Foreign Application Priority Data

Nov. 4, 2020 (JP) ............................. JP2020-184246

(51) Int. Cl.
*F16L 3/10* (2006.01)
*F16L 3/237* (2006.01)

(52) U.S. Cl.
CPC ............. *F16L 3/1083* (2013.01); *F16L 3/237* (2013.01)

(58) Field of Classification Search
CPC . F16L 3/1083; F16L 3/237; F16L 3/00; F16B 7/04
USPC .................................................. 248/62, 68.1
See application file for complete search history.

(56) References Cited

U.S. PATENT DOCUMENTS

| | | | | |
|---|---|---|---|---|
| 9,377,135 B2 * | 6/2016 | Karls | .................... | F16L 3/127 |
| 2009/0146021 A1 * | 6/2009 | Becker | .................... | F16L 3/237 |
| | | | | 248/68.1 |
| 2015/0233496 A1 * | 8/2015 | Chouinard | .............. | F16L 3/237 |
| | | | | 248/62 |
| 2015/0300532 A1 * | 10/2015 | Karls | .................... | F16L 3/127 |
| | | | | 248/73 |
| 2019/0234535 A1 * | 8/2019 | Reznar | ................ | F16C 11/0604 |
| 2020/0318671 A1 * | 10/2020 | Jochum | .............. | B60R 13/0212 |
| 2021/0341081 A1 * | 11/2021 | Peters | ..................... | F16L 3/237 |
| 2022/0136620 A1 * | 5/2022 | Ogino | .................. | F16L 3/1075 |
| | | | | 248/62 |

FOREIGN PATENT DOCUMENTS

| | | | | |
|---|---|---|---|---|
| JP | 3314115 B2 | 5/2002 | | |
| WO | WO-2019096931 A1 * | 5/2019 | ............. | B60N 3/046 |

* cited by examiner

*Primary Examiner* — Muhammad Ijaz
(74) *Attorney, Agent, or Firm* — Christensen, Fonder, Dardi & Herbert PLLC

(57) ABSTRACT

A connecting structure of a first holding device and a second holding device that are respectively configured to hold a first elongated member and a second elongated member, may include a cylindrical anchor formed on the first holding device and having an engagement claw, and an insertion hole formed on the second holding device and configured such that the anchor is introduced thereinto and the engagement claw engages a circumferential periphery thereof. The first and second holding devices are configured to be rotated relative to each other about an axis of the anchor in a connected condition of the first holding device and the second holding device in which the engagement claw engages the circumferential periphery of the insertion hole. The first and second holding devices include a distortion prevention mechanism configured to prevent the anchor from being distorted in the connected condition of the first and second holding devices.

9 Claims, 14 Drawing Sheets

HOLDING DEVICE CONNECTING STRUCTURES

CROSS-REFERENCE TO RELATED APPLICATIONS

This application claims priority to a Japanese Patent Application serial number 2020-184246 filed Nov. 4, 2020, the contents of which are incorporated herein by reference.

BACKGROUND

The disclosure relates to holding device connecting structures. More specifically, the disclosure relates to holding device connecting structures that are configured to connect or couple two holding devices each of which is configured to hold an elongated article (e.g., wiring harness).

Conventionally, a combination of two holding devices (clips) that are respectively configured to hold two elongated articles (e.g., two wiring harnesses) at regular intervals are known. Such a combination of the holding devices is taught, for example, by Japanese Patent No. 3314115. In the combination of the holding devices taught by Japanese Patent No. 3314115, the holding devices are rotatably connected to each other via connecting shafts, so as to rotate relative to each other. According to the combination of the holding devices, even if relative misalignment of the elongated articles is produced, the holding devices may rotate relative to each other, so that such misalignment of the elongated articles may be effectively absorbed. As a result, the elongated articles may be suitably held by the holding devices.

However, in the combination of the holding devices, when the holding devices are unexpectedly subjected to an excessive external force via the elongated articles held thereby, the connecting shafts of the holding devices may be excessively skewed or distorted. As a result, the holding devices may be prevented from smoothly rotating relative to each other.

Therefore, there is a need in the art for an improved holding device connecting structure.

SUMMARY

In one aspect of the present disclosure, a connecting structure of a first holding device and a second holding device that are respectively configured to hold a first elongated member and a second elongated member, may include a cylindrical anchor formed on the first holding device and having an engagement claw, and an insertion hole formed on the second holding device and configured such that the anchor is introduced thereinto and the engagement claw engages a circumferential periphery thereof. The first holding device and the second holding device are configured to be rotated relative to each other about an axis of the anchor in a connected condition of the first holding device and the second holding device in which the engagement claw of the anchor engages the circumferential periphery of the insertion hole. The first holding device and the second holding device include a distortion prevention mechanism that is configured to prevent the anchor from being distorted in the connected condition of the first holding device and the second holding device.

According to the connecting structure, even when an external force is applied to the first holding device and the second holding device via the first wiring harness and the second wiring harness, the anchor may be prevented from being skewed or distorted. As a result, the first holding device and the second holding device can smoothly rotate relative to each other even when the external force is applied thereto.

The distortion prevention mechanism may include a projection formed on the second holding device and configured to enter the anchor in the connected condition of the first holding device and the second holding device. Alternatively, the distortion prevention mechanism may include support walls formed on the second holding device and configured to be positioned adjacent to an outer circumferential surface of the anchor in the connected condition of the first holding device and the second holding device.

Other objects, features and advantages of the present invention will be readily understood after reading the following detailed description together with the accompanying drawings and the claims.

DETAILED DESCRIPTION

A detailed representative embodiment of the present disclosure will be described with reference to FIGS. 1 to 18.

In the representative embodiment, a first holding device 1 and a second holding device 2 may be connected or coupled to each other via a special connecting structure (which may be referred to as a holding device connecting structure), thereby forming a combination thereof. Further, the first holding device 1 may be configured to hold or clamp a first wiring harness 40, i.e., a first elongated member (FIGS. 8 to 12). Conversely, the second holding device 2 may be configured to hold or clamp a second wiring harness 50, i.e., a second elongated member (FIGS. 8 to 12).

Figure 1:
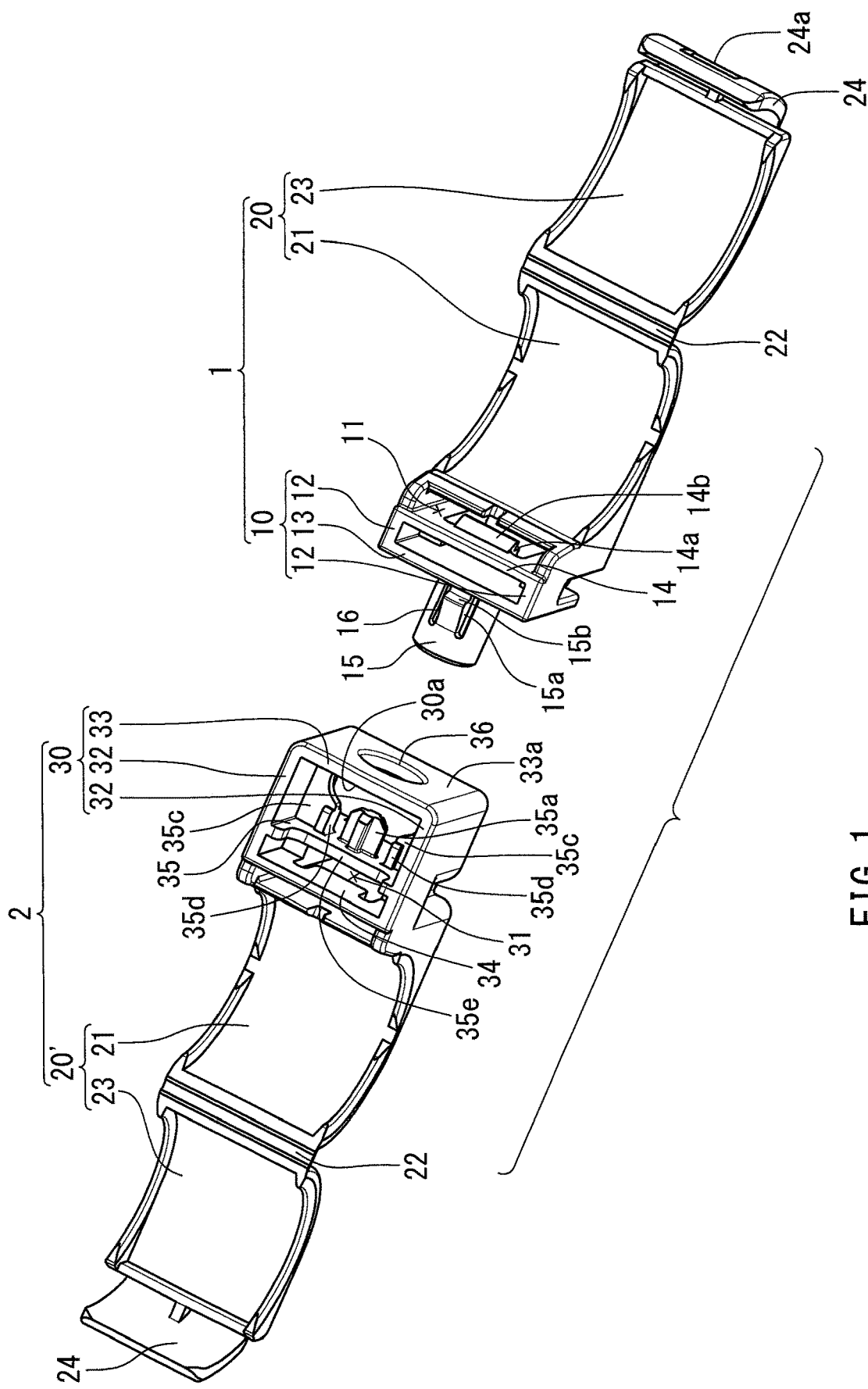
FIG. 1 is an exploded perspective view of a combination of first and second holding devices according to a representative embodiment of the present disclosure.
Figure 2:
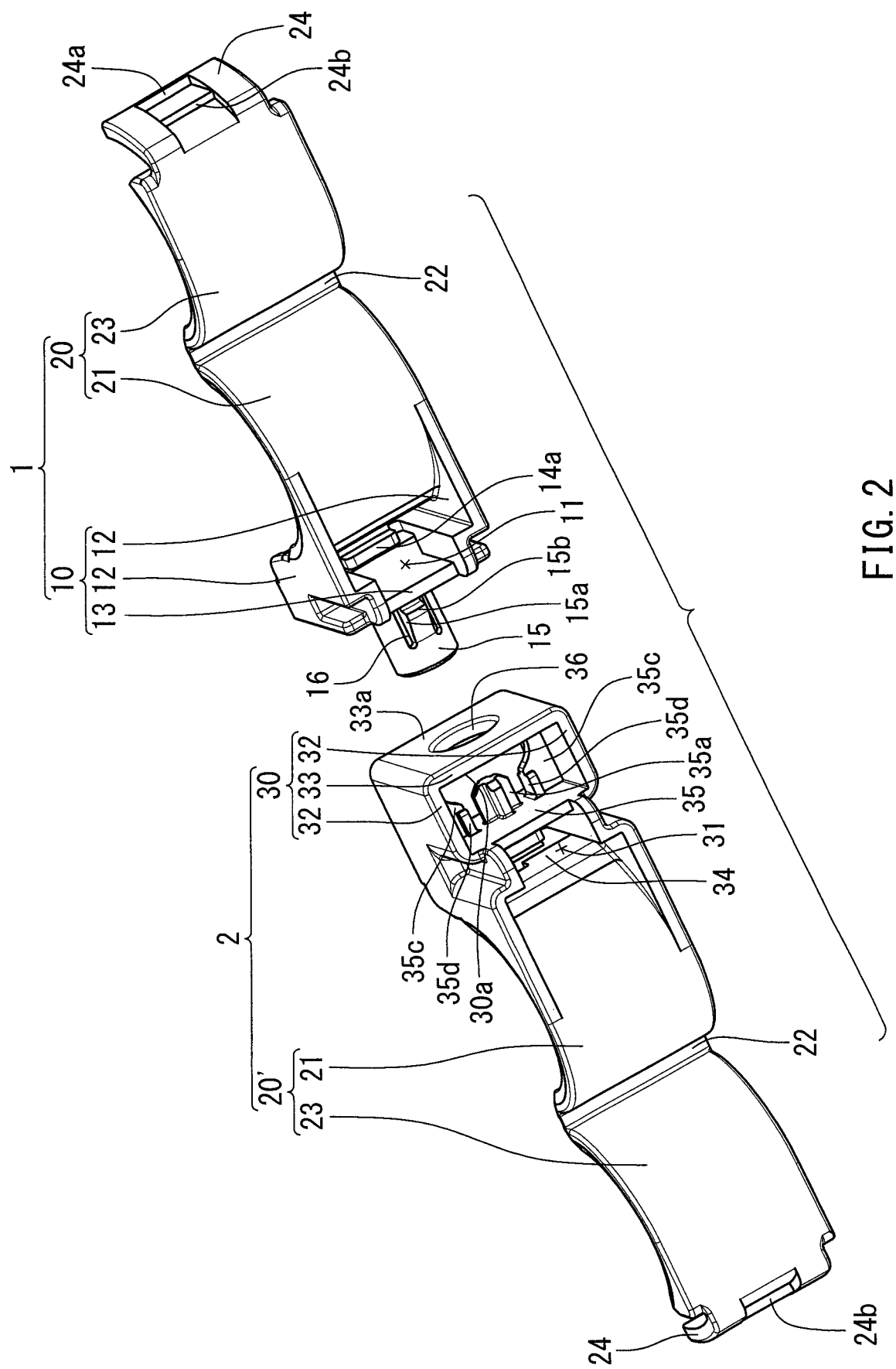
FIG. 2 is an exploded bottom perspective view of the combination of the holding devices.
Figure 3:
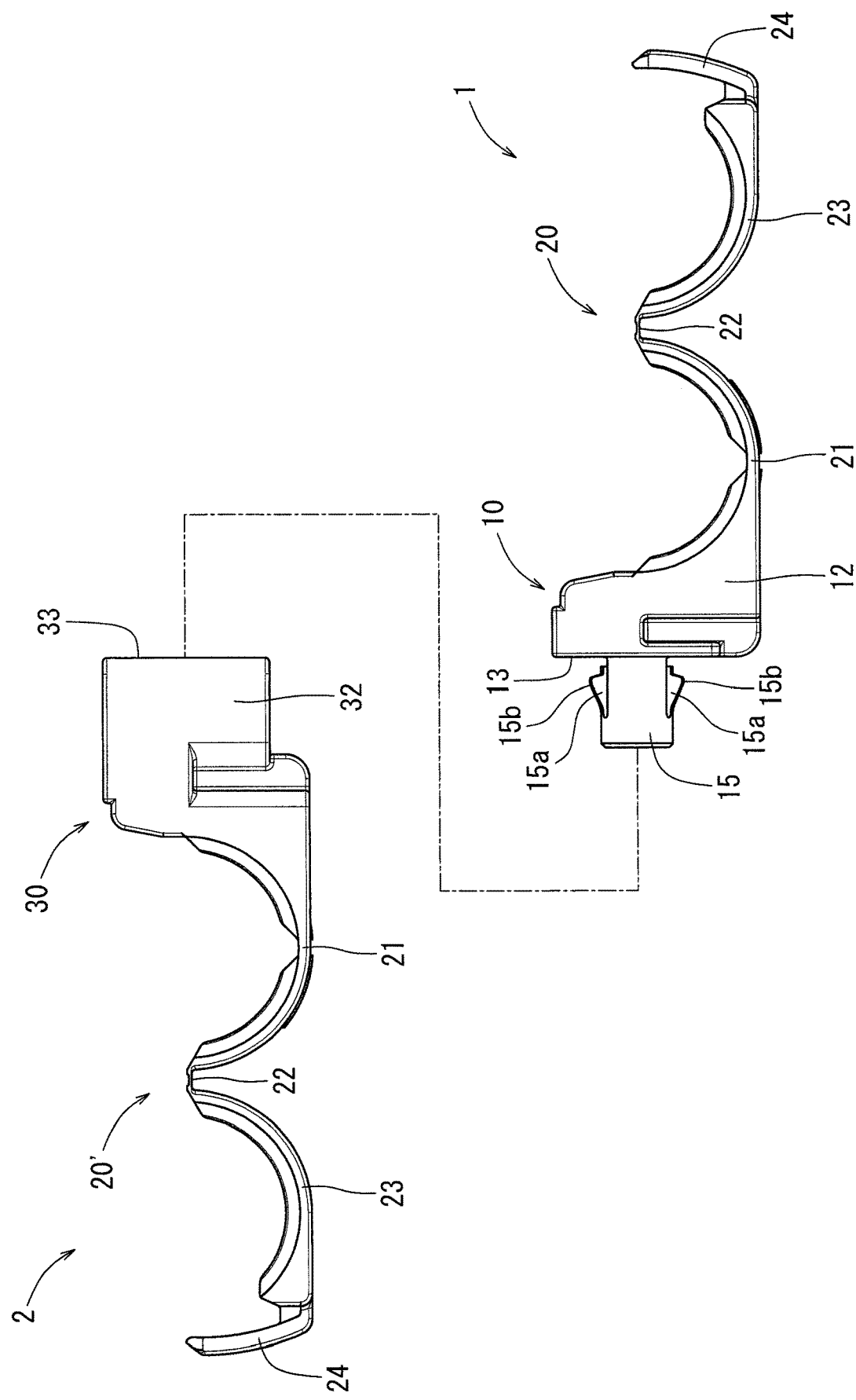
FIG. 3 is an exploded elevational view of the combination of the holding devices.
Figure 4:
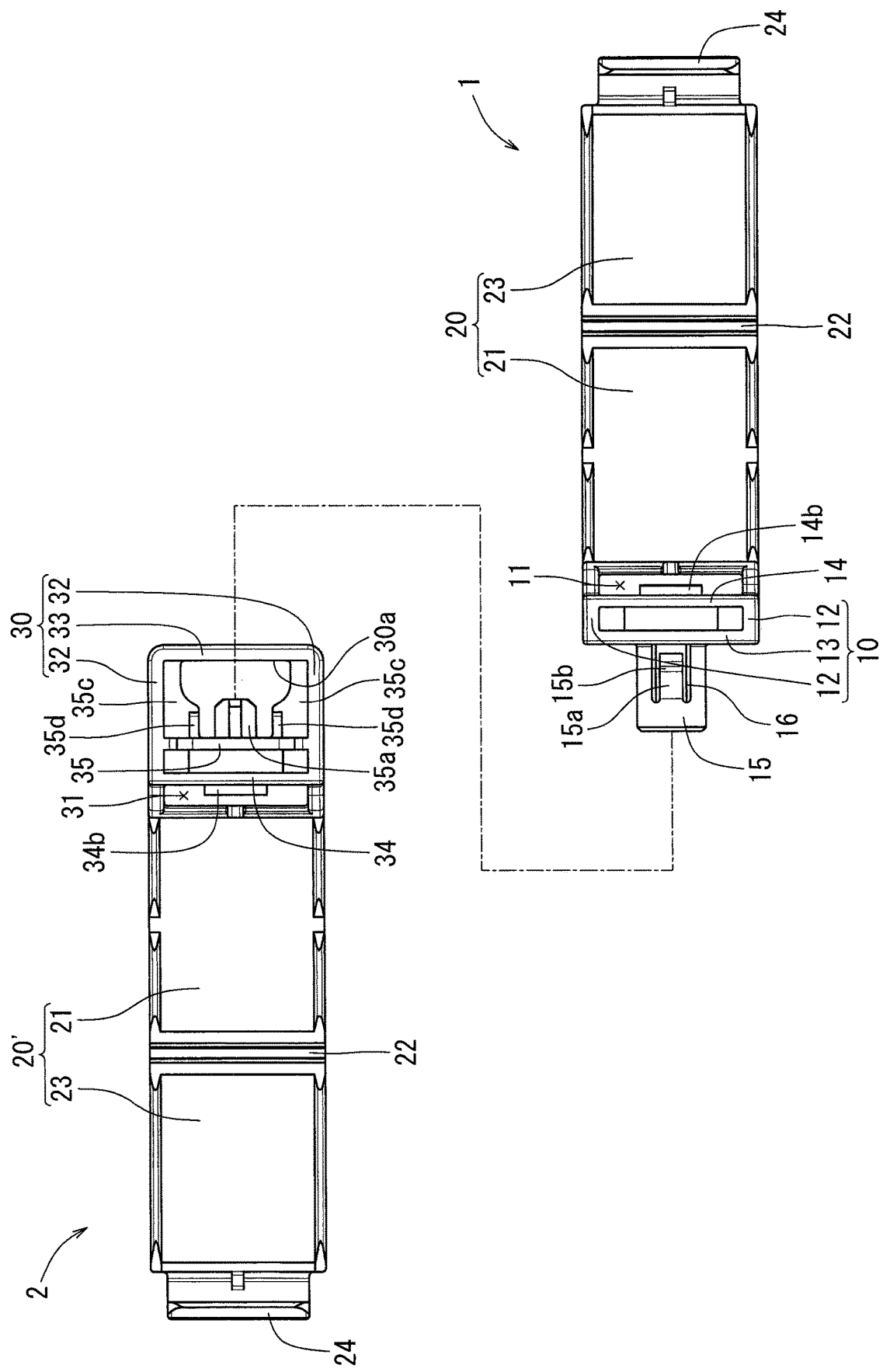
FIG. 4 is an exploded plan view of the combination of the holding devices.

As shown in FIGS. 1 and 2, the first holding device 1 may include a connecting (coupling) element 10 and a holding (clamping) element 20 that are integrated with each other. The connecting element 10 and the holding element 20 may preferably be integrally formed by molding of a hard synthetic resin. The connecting element 10 may include a pair of side walls 12 and a transverse end wall 13 integrated with distal end peripheries of the side walls 12, so as to be formed as a U-shaped frame body having upper and lower openings (not labeled). The connecting element 10 may be integrated with the holding element 20 at proximal end peripheries of the side walls 12, so as to define an insertion space 11 therebetween. Further, the connecting element 10 may have a crosspiece or support portion 14 laterally bridging the side walls 12 and extending across the insertion space 11. The support portion 14 may have a flexible engagement strip 14*a* having an engagement claw 14*b* that is projected toward the holding element 20.

As shown in FIGS. 1 and 2, the connecting element 10 may further include a hollow cylindrical anchor 15 formed on an outer surface of the end wall 13 and projected outward therefrom in a direction perpendicular to the outer surface of the end wall 13. The anchor 15 may have a pair of (upper and lower) cantilevered engagement strips 15*a* diametrically oppositely formed thereon and respectively having engagement claws 15*b*. The engagement strips 15*a* may be configured to extend from a distal end portion of the anchor 15 toward the end wall 13. In particular, the engagement strips 15*a* may respectively be defined by U-shaped slots formed on the anchor 15. Therefore, the engagement strips 15 may radially oppositely flex toward and away from an axis of the anchor 15.

Conversely, as shown in FIGS. 1 and 2, the holding element 20 may include a substantially semicircular holding body (first curved portion) 21 connected to or integrated with the proximal end peripheries of the side walls 12 of the connecting element 10 at a proximal end thereof, and a substantially semicircular holding cover (second curved portion) 23 of which the proximal end is rotatably or pivotally connected to a distal end of the holding body 21 via a hinge 22. The holding body 21 and the holding cover 23 may respectively be configured to suitably hold or clamp the first wiring harness 40 regardless of whether the first wiring harness 40 has a small diameter or a large diameter. Further, the holding cover 23 may have an engagement strip 24 formed on a distal end thereof. The engagement strip 24 may be configured to be introduced into the insertion space 11 of the connecting element 10 in a condition in which the first wiring harness 40 is clamped between the holding body 21 and the holding cover 23, i.e., in a clamping condition of the holding element 20.

The engagement strip 24 of the holding cover 23 may have a first engagement claw 24*a* and a second engagement claw 24*b* that are positioned in alignment with each other in a rotational direction of the holding cover 23 (FIG. 2). The first engagement claw 24*a* may be configured to engage the engagement claw 14*b* of the engagement strip 14*a* when the first wiring harness 40 having a large diameter is clamped between the holding body 21 and the holding cover 23.

Conversely, the second engagement claw 24*b* may be configured to engage the engagement claw 14*b* of the engagement strip 14*a* when the first wiring harness 40 having a small diameter is clamped between the holding body 21 and the holding cover 23.

In order to clamp the first wiring harness 40 having a large diameter by the first holding device 1, the first wiring harness 40 may be positioned on the holding body 21. Thereafter, the holding cover 23 may be rotated relative to the holding body 21 via the hinge 22, so as to be fully wrapped around the first wiring harness 40. As a result, the engagement strip 24 may be introduced into the insertion space 11 of the connecting element 10, so that the first engagement claw 24*a* formed on the engagement strip 24 engages the engagement claw 14*b* of the engagement strip 14*a*. Thus, the large-diameter first wiring harness 40 may be held by the holding element 20 (FIGS. 8 to 12 and 14). Conversely, in order to clamp the first wiring harness 40 having a small diameter, the first wiring harness 40 may be positioned on the holding body 21. Thereafter, the holding cover 23 may be rotated relative to the holding body 21 via the hinge 22, so as to be fully wrapped around the first wiring harness 40. As a result, the engagement strip 24 may be introduced into the insertion space 11 of the connecting element 10, so that the second engagement claw 24*b* formed on the engagement strip 24 engages the engagement claw 14*b* of the engagement strip 14*a*. Thus, the small-diameter first wiring harness 40 may be held by the holding element 20 (not shown).

As shown in FIGS. 1 and 2, the second holding device 2 may include a connecting (coupling) element 30 and a holding (clamping) element 20' that are integrated with each other. The connecting element 30 and the holding element 20' may preferably be integrally formed by molding of a hard synthetic resin. Further, the holding element 20' has the same structure as the holding element 20 of the first holding device 1 except that the holding element 20' is configured to hold or clamp the second wiring harness 50. Therefore, elements that are the same in the holding element 20 and the holding element 20' will be identified by the same reference numerals and a detailed description of such elements may be omitted.

Figure 5:
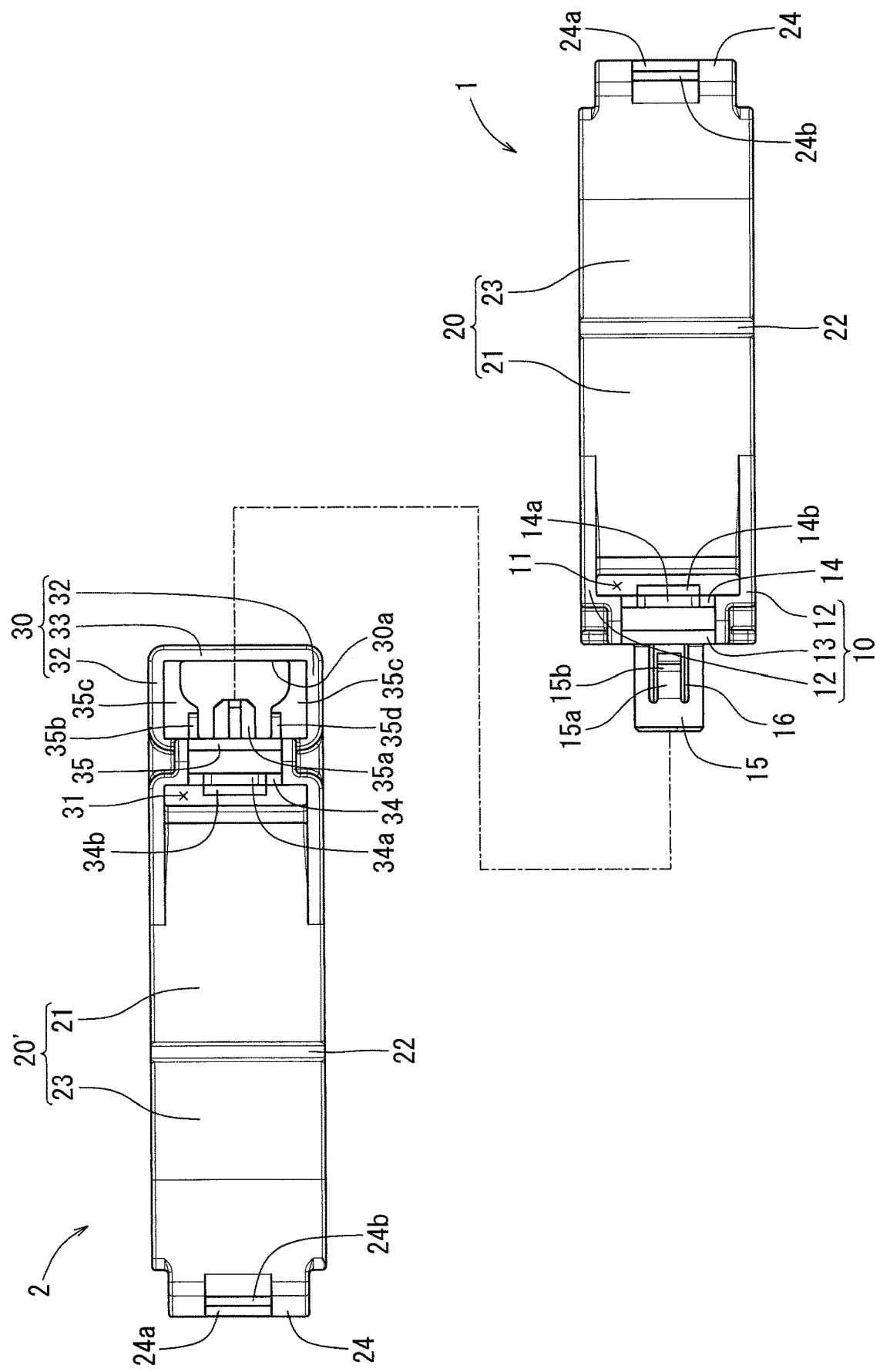
FIG. 5 is an exploded bottom plan view of the combination of the holding devices.
Figure 6:
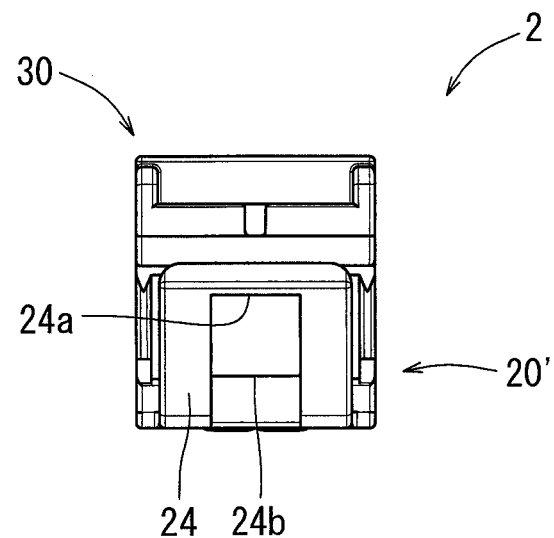
FIG. 6 is a left side view of the combination of the holding devices.
Figure 7:
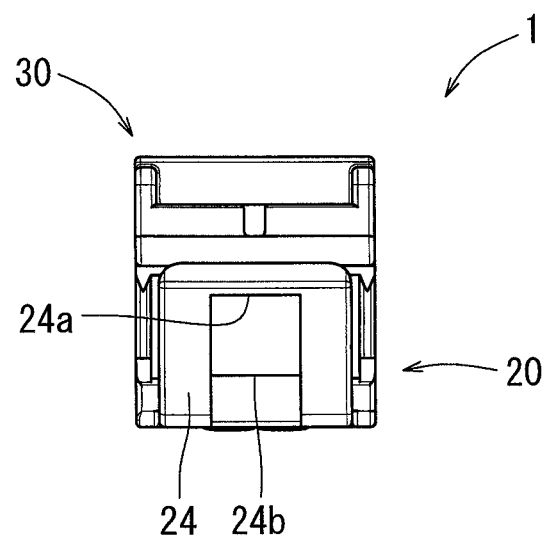
FIG. 7 is a right side view of the combination of the holding devices.
Figure 8:
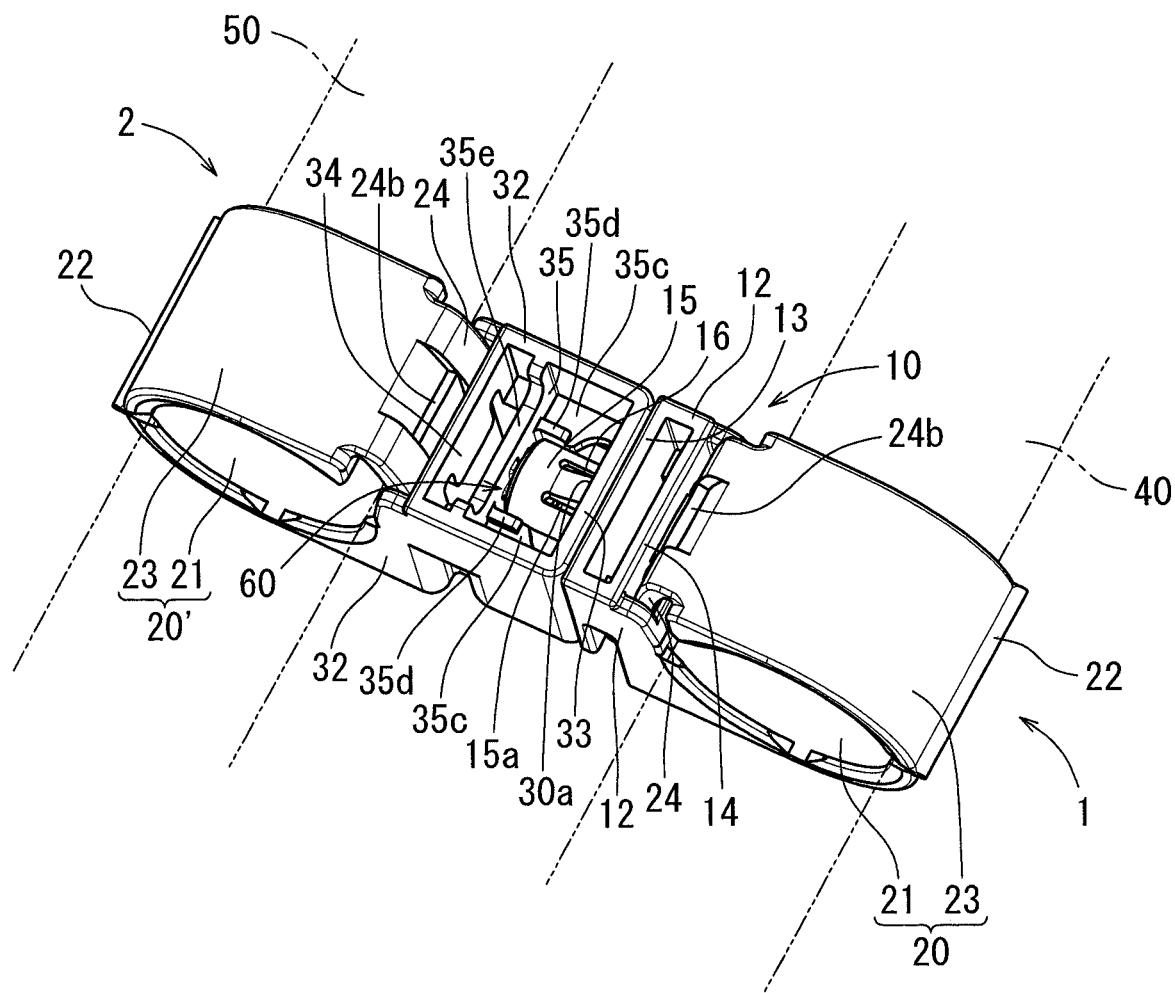
FIG. 8 is a perspective view of the combination of the holding devices, which illustrates a condition in which (large diameter) wiring harnesses are held or clamped by the holding devices.
Figure 9:
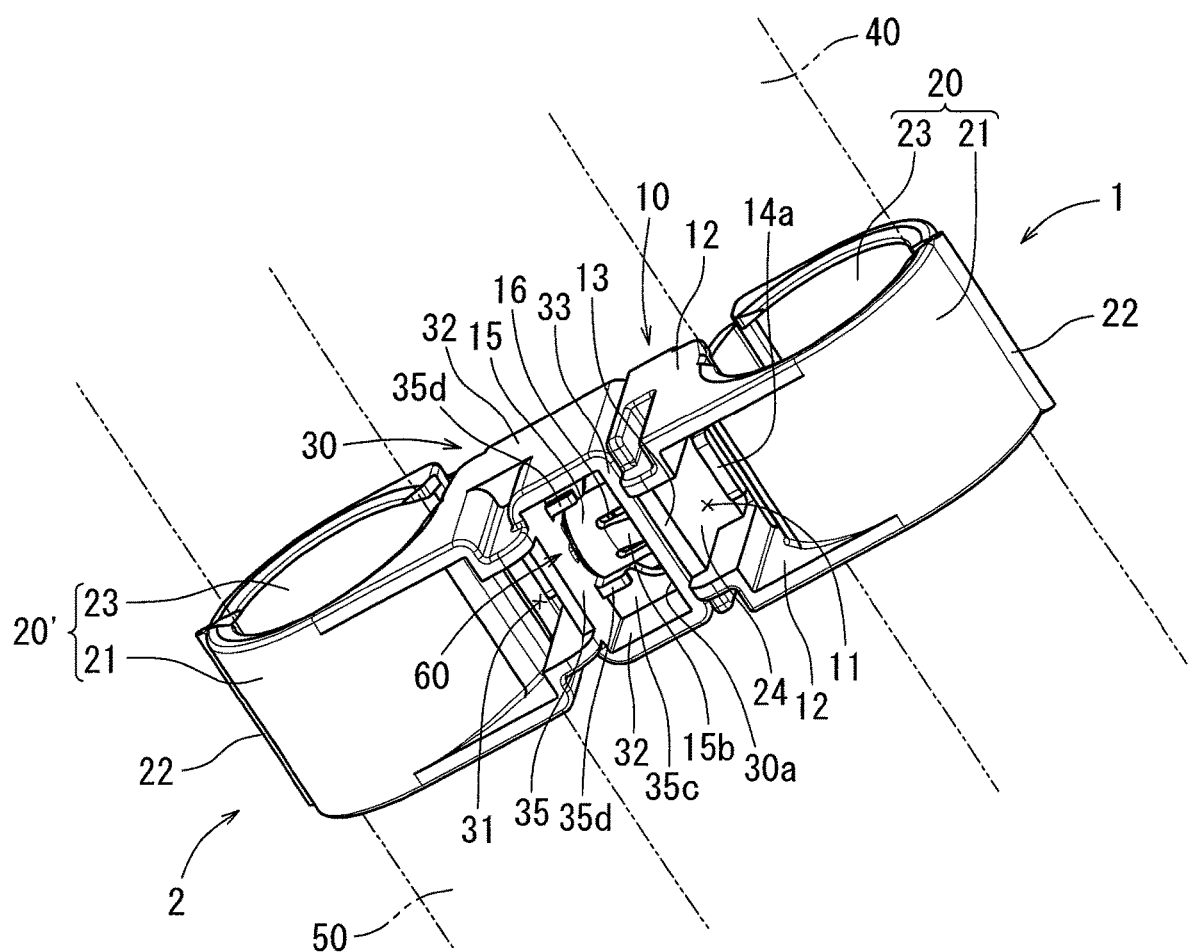
FIG. 9 is a bottom perspective view of the combination of the holding devices.
Figure 10:
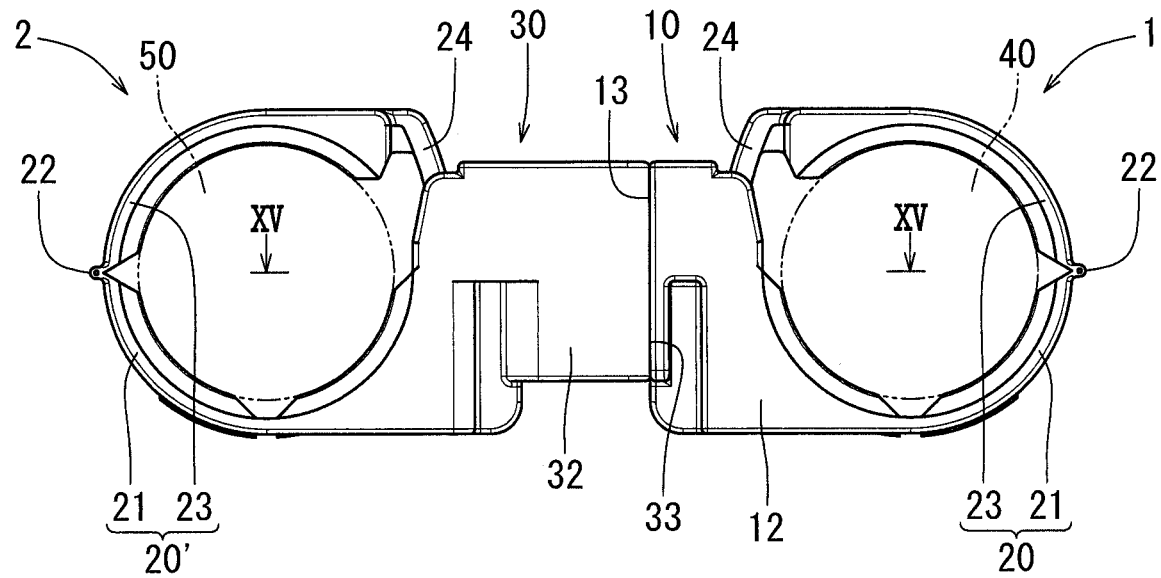
FIG. 10 is an elevational view of the combination of the holding devices.

The connecting element 30 may include a pair of side walls 32 and a transverse end wall 33 integrated with distal end peripheries of the side walls 32, so as to be formed as a U-shaped frame body having an upper opening 30*a* and a lower opening (not labeled). The connecting element 30 may be integrated with the holding element 20' at proximal end peripheries of the side walls 32, so as to define an insertion space 31 therebetween. Further, the connecting element 30 may have a first crosspiece or support portion 34 and a second crosspiece or support portion 35 formed therein and positioned at intervals. The first and second support portions 34 and 35 respectively laterally bridge the side walls 32 and extend across the insertion space 31. The first support portion 34 may have a flexible engagement strip 34*a* having an engagement claw 34*b* that is projected toward the holding element 20' (FIG. 5).

As shown in FIGS. 1 and 2, The connecting element 30 may include an insertion hole 36 formed on the end wall 33 and opening in an outer surface 33*a* of the end wall 33. Further, the insertion hole 36 may have a diameter slightly greater than an outer diameter of the anchor 15 of the first holding device 1 so as to allow the anchor 15 to be inserted or introduced thereinto while oppositely flexing the engagement strips 15*a*.

Figure 15:
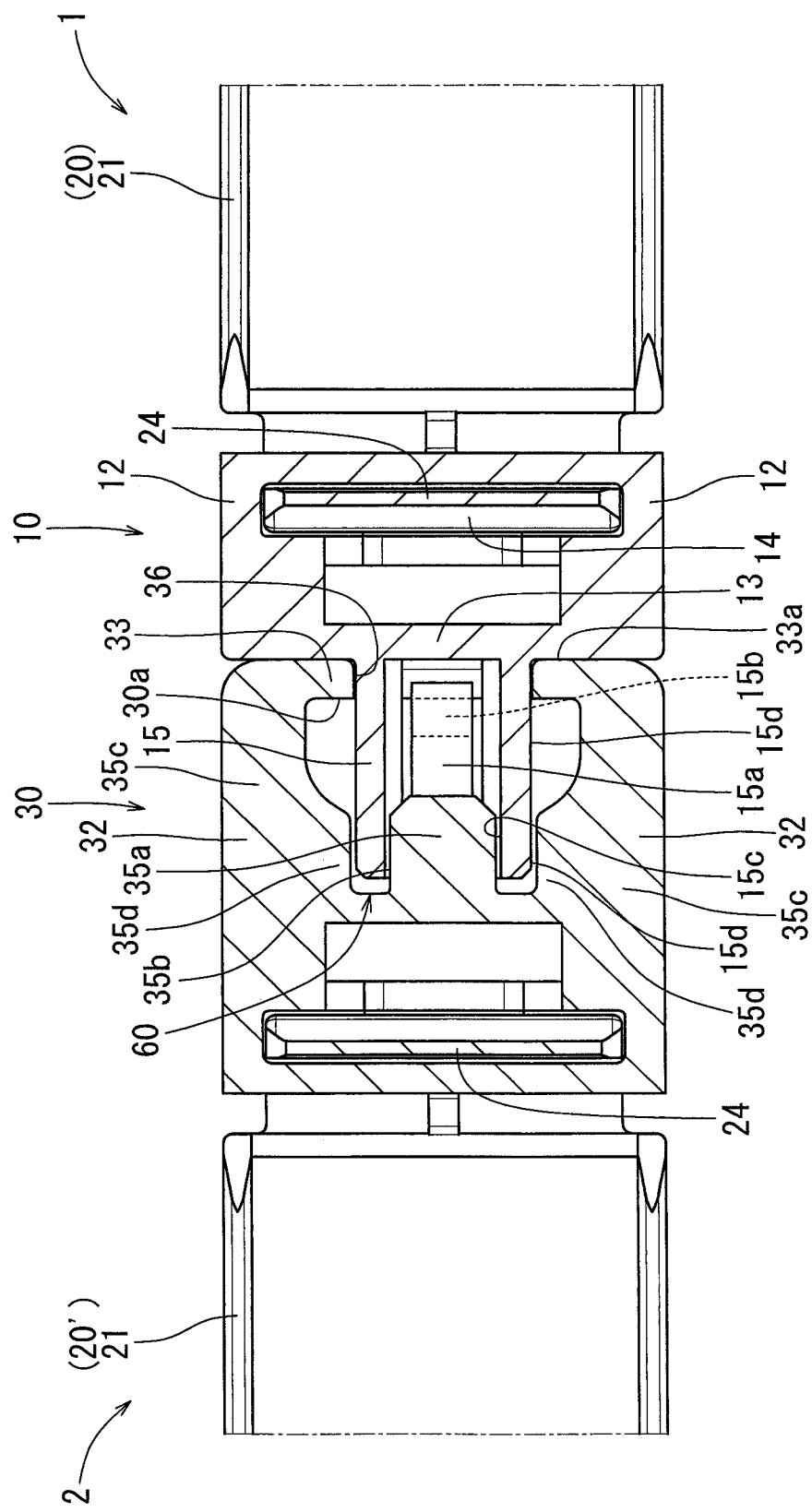
FIG. 15 is a cross-sectional view taken along line XV-XV in FIG. 10.

As shown in FIGS. 1, 2 4 and 5, the connecting element 30 may include a columnar projection 35a (which may be referred to as an engagement member) formed on the second support portion 35. The projection 35a may be projected therefrom toward the insertion hole 36. That is, the projection 35a may substantially be positioned in alignment with the insertion hole 36. The projection 35a may preferably have a cross-shape in cross section. Further, the projection 35a may have an outer diameter slightly smaller than an inner diameter of the anchor 15 of the first holding device 1, so as to enter or engage the anchor 15 (FIG. 15). The connecting element 30 may further include a pair of side support walls 35d (which may be referred to as an engagement member) formed on the second support portion 35 and positioned on both sides of the projection 35a. The support walls 35d may respectively be integrated with (horizontal) support walls 35c integrated with the second support portion 35 and the side walls 32. Further, the support walls 35d may be positioned such that a distance therebetween is slightly greater than the outer diameter of the anchor 15 (FIG. 15). Further, the second support portion 35 may have a recessed portion 35e formed on an upper edge thereof (an edge corresponding to the upper opening 30a of the connecting element 30) and facing the upper opening 30a of the connecting element 30.

In order to clamp the second wiring harness 50 having a large diameter by the second holding device 2, the second wiring harness 50 may be positioned on the holding body 21. Thereafter, the holding cover 23 may be rotated relative to the holding body 21 via the hinge 22, so as to be wrapped around the second wiring harness 50. As a result, the engagement strip 24 may be introduced into the insertion space 31 of the connecting element 30, so that the first engagement claw 24a formed on the engagement strip 24 engages the engagement claw 34b of the engagement strip 34a. Thus, the large-diameter second wiring harness 50 may be held by the holding element 20' (FIGS. 8 to 13). Conversely, in order to clamp the second wiring harness 50 having a small diameter, the second wiring harness 50 may be positioned on the holding body 21. Thereafter, the holding cover 23 may be rotated relative to the holding body 21 via the hinge 22, so as to be fully wrapped around the second wiring harness 50. As a result, the engagement strip 24 may be introduced into the insertion space 31 of the connecting element 30, so that the second engagement claw 24b formed on the engagement strip 24 engages the engagement claw 34b of the engagement strip 34a. Thus, the small-diameter second wiring harness 50 may be held by the holding element 20' (not shown).

Figure 11:
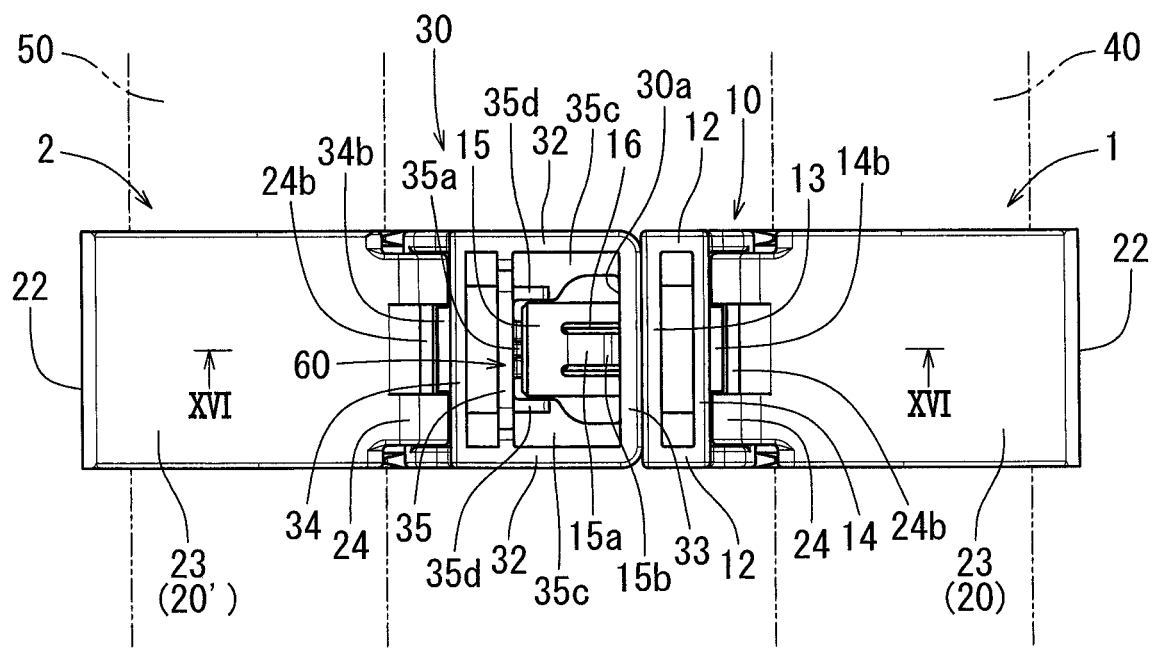
FIG. 11 is a plan view of the combination of the holding devices.
Figure 12:
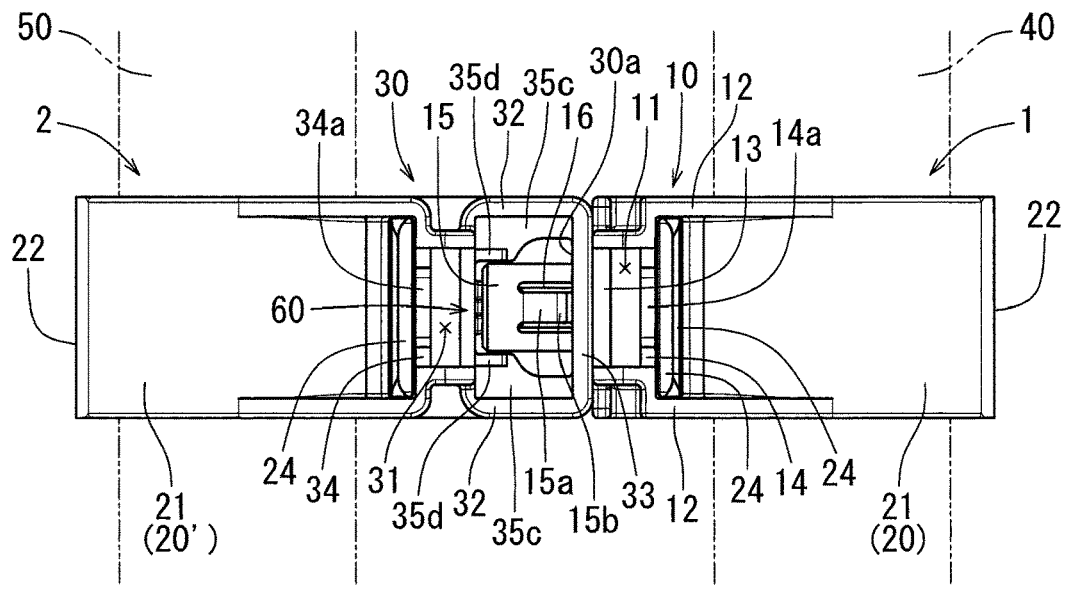
FIG. 12 is a bottom plan view of the combination of the holding devices.
Figure 13:
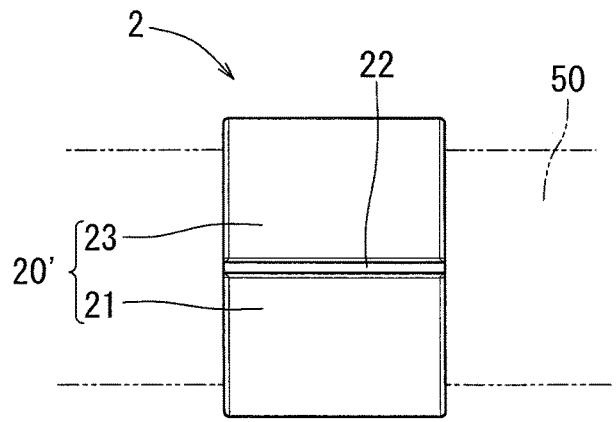
FIG. 13 is a left side view of the combination of the holding devices.
Figure 14:
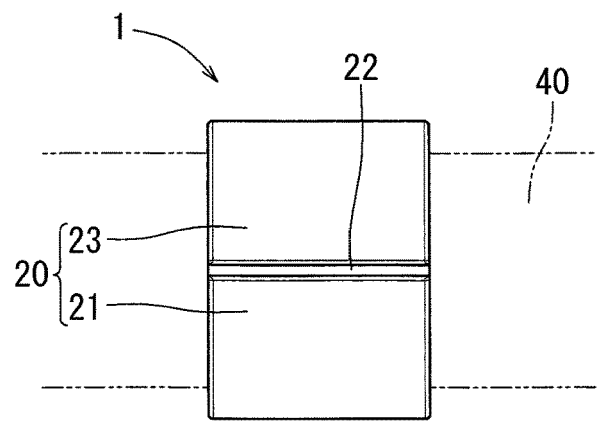
FIG. 14 is a right side view of the combination of the holding devices.
Figure 16:
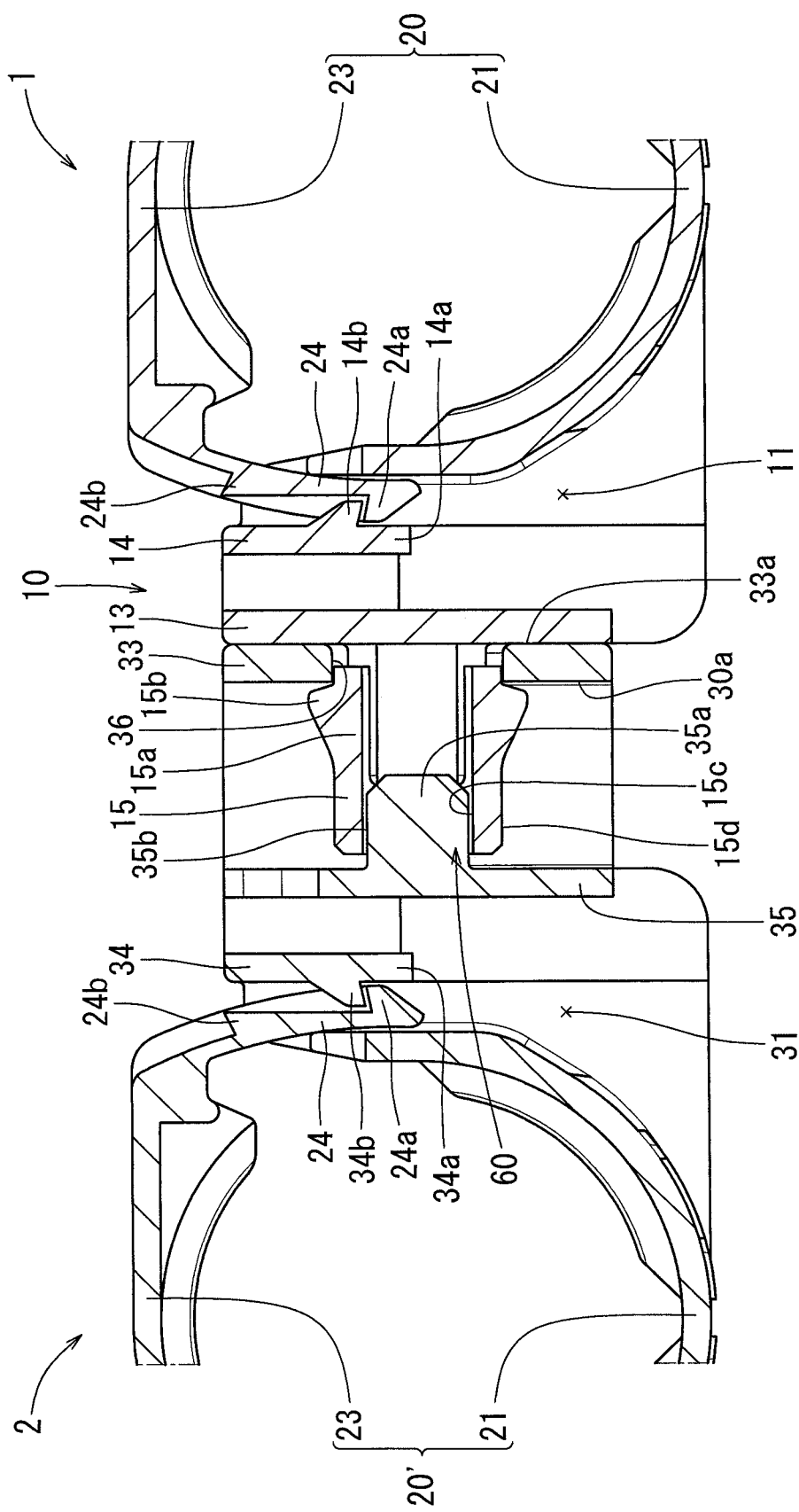
FIG. 16 is a cross-sectional view taken along line XVI-XVI in FIG. 11.

Next, in order to connect or couple the first holding device 1 and the second holding device 2, the anchor 15 formed on the connecting element 10 of the first holding device 1 is simply pressed into the insertion hole 36 formed on the connecting element 30 of the second holding device 2. As a result, the anchor 15 is inserted or introduced into the insertion hole 36 while the engagement strips 15a formed thereon are flexed radially inward due to contact with an inner circumferential surface of the insertion hole 36. Thereafter, when the engagement strips 15a pass through the insertion hole 36 (when the anchor 15 is fully introduced into the insertion hole 36), the engagement strips 15a are restored or flexed radially outward, so that the engagement claws 15b of the engagement strips 15a engage a circumferential periphery of the insertion hole 36 (FIGS. 11, 12 and 16). As a result, the first holding device 1 and the second holding device 2 are securely coupled or connected to each other, thereby reaching a coupled or connected condition thereof. Thus, a combination of the first holding device 1 and the second holding device 2 may be formed.

Figure 17:
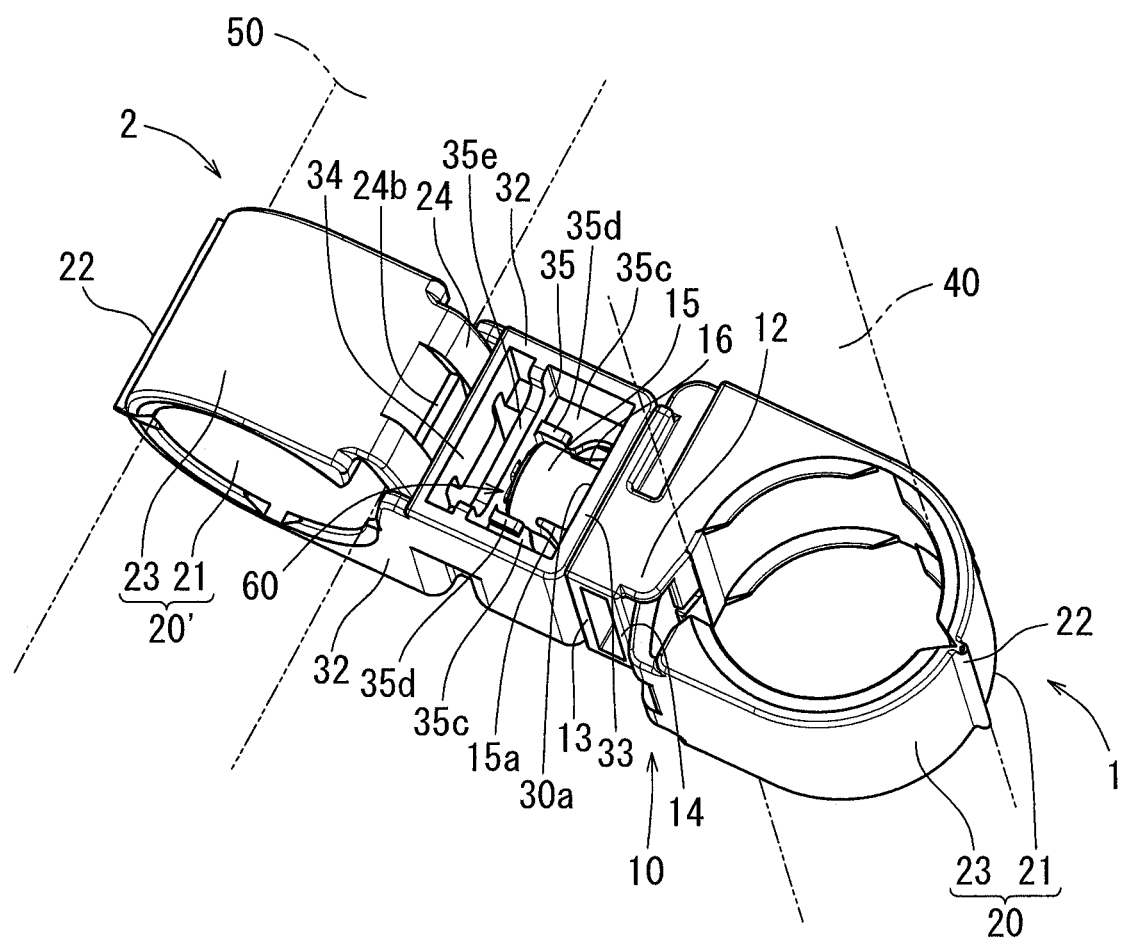
FIG. 17 is a perspective view similar to FIG. 8, which illustrates a condition in which the holding devices are rotated 90 degrees with respect to each other.
Figure 18:
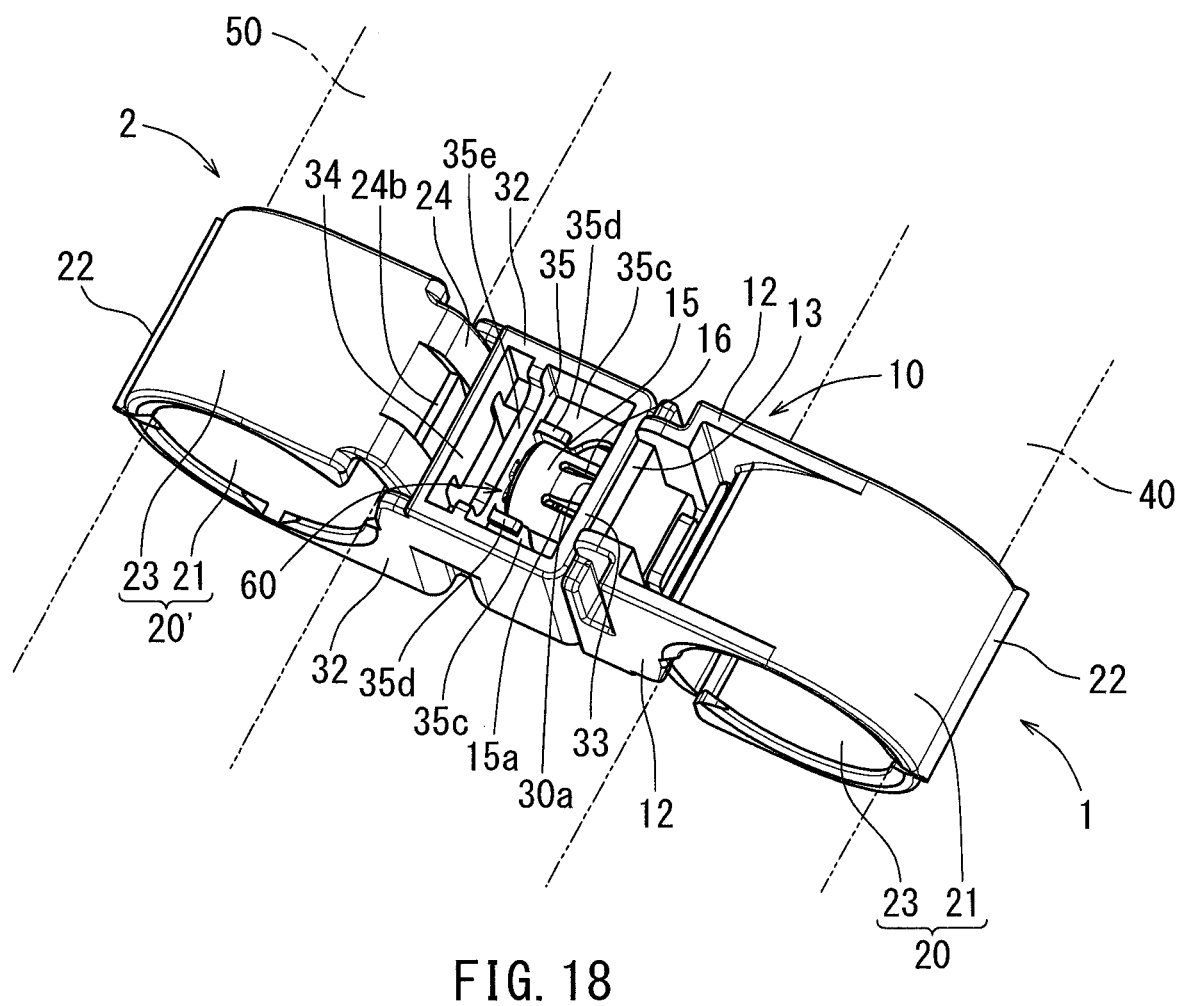
FIG. 18 is a perspective view similar to FIG. 8, which illustrates a condition in which the holding devices are rotated 180 degrees with respect to each other.

As shown in FIGS. 17 and 18, in the connected condition of the first holding device 1 and the second holding device 2, the first holding device 1 and the second holding device 2 can be freely rotated relative to each other about the axis of the anchor 15 at any angle (e.g., 90, 180 and 360 degrees).

Further, in the connected condition of the first holding device 1 and the second holding device 2, the projection 35a formed the connecting element 30 of the second holding device 2 enters or engages the anchor 15 while an outer surface 35b thereof is positioned adjacent to an inner circumferential surface 15c of the anchor 15 (FIGS. 15 and 16). Such an arrangement and structure of the projection 35a and the anchor 15 may be referred to as a distortion prevention mechanism 60 (which may be referred to as an anchor stabilizing mechanism). Further, in the connected condition, the side support walls 35d of the connecting element 30 are positioned laterally adjacent to an outer circumferential surface 15d of the anchor 15 (FIG. 15). In other words, in the connected condition, the side support walls 35d of the connecting element 30 engages the anchor 15 while loosely holding the anchor 15 therebetween. Such an arrangement and structure of the anchor 15 and the side support walls 35d may also be referred to as the distortion prevention mechanism 60.

Conversely, in order to disconnect or decouple the first holding device 1 and the second holding device 2, the engagement strips 15a of the anchor 15 of the connecting element 10 are manually flexed radially inward by a worker via the upper opening 30a of the connecting element 30, so as to disengage the engagement claws 15b of the engagement strips 15a from the circumferential periphery of the insertion hole 36 of the connecting element 30. Upon disengagement of the engagement claws 15b, the anchor 15 can be withdrawn from the insertion hole 36. Thus, the first holding device 1 and the second holding device 2 can be easily decoupled without damaging the connecting elements 10 and 30. Further, the recessed portion 35e formed on the second support portion 35 allows the worker to easy access to the engagement strips 15a of the anchor 15 via the upper opening 30a of the connecting element 30.

According to the connecting structure of the first holding device 1 and the second holding device 2, the first holding device 1 and the second holding device 2 can be freely rotated relative to each other about the axis of the anchor 15 in the connected condition thereof. Further, the first holding device 1 and the second holding device 2 may include the distortion prevention mechanism 60. Therefore, even when the first holding device 1 and the second holding device 2 are subjected to an external force via the first wiring harness 40 and the second wiring harness 50, the anchor 15 may be prevented from being skewed or distorted due to the distortion prevention mechanism 60, so that the first holding device 1 and the second holding device 2 can smoothly rotate relative to each other. In particular, when the anchor 15 may be inclined due to the external force applied to the first holding device 1 and the second holding device 2, the inner circumferential surface 15c of the anchor 15 may contact the outer surface 35b of the projection 35a while the outer circumferential surface 15d of the anchor 15 may contact the side support walls 35d. As a result, the anchor 15 may be prevented from being excessively inclined, so as to be effectively prevented from being skewed or distorted. Therefore, the first holding device 1 and the second holding device 2 can smoothly rotate relative to each other.

Naturally, various changes and modifications may be made to the embodiment. For example, in the embodiment, the first wiring harness 40 and the second wiring harness 50 are exemplified as the first elongated member and the second elongated member. However, the first and second elongated members may be hoses, wires or other such members.

Further, each of the holding element 20 of the first holding device 1 and the holding element 20' of the second holding device 2 includes the substantially semicircular holding body 21 and the substantially semicircular holding cover 23. However, the holding body 21 and the holding cover 23 may respectively be a U-shaped holding body and a U-shaped holding cover.

A representative example of the present disclosure has been described in detail with reference to the attached drawings. This detailed description is merely intended to teach a person of skill in the art further details for practicing preferred aspects of the present disclosure and is not intended to limit the scope of the disclosure. Only the claims define the scope of the claimed disclosure. Therefore, combinations of features and steps disclosed in the foregoing detailed description may not be necessary to practice the disclosure in the broadest sense, and are instead taught merely to particularly describe detailed representative examples of the disclosure. Moreover, the various features taught in this specification may be combined in ways that are not specifically enumerated in order to obtain additional useful embodiments of the present disclosure.

What is claimed is:

1. A connecting structure of a first holding device and a second holding device that are respectively configured to hold a first elongated member and a second elongated member,
    wherein the first holding device includes a cylindrical anchor formed thereon and having an engagement claw,
    wherein the second holding device includes an insertion hole formed thereon and configured such that the anchor is introduced thereinto and the engagement claw engages a circumferential periphery thereof,
    wherein the first holding device and the second holding device are configured to be rotated relative to each other about an axis of the anchor in a connected condition of the first holding device and the second holding device in which the engagement claw of the anchor engages the circumferential periphery of the insertion hole,
    wherein the first holding device and the second holding device include a distortion prevention mechanism that is configured to prevent the anchor from being distorted in the connected condition of the first holding device and the second holding device,
    wherein the distortion prevention mechanism includes a columnar projection formed on the second holding device, and
    wherein the projection is configured to enter the anchor in such a manner that an outer surface of the projection is positioned adjacent to an inner surface of the anchor in the connected condition of the first holding device and the second holding device.

2. The connecting structure as defined in claim 1, wherein the second holding device includes a connecting element having an opening, and
    wherein the insertion hole is formed on an end wall of the connecting element.

3. The connecting structure as defined in claim 1, wherein the distortion prevention mechanism includes support walls formed on the second holding device, and
    wherein the support walls are configured to be positioned adjacent to an outer circumferential surface of the anchor in the connected condition of the first holding device and the second holding device.

4. The connecting structure as defined in claim 3, wherein the second holding device includes a connecting element having an opening,
    wherein the insertion hole is formed on an end wall of the connecting element,
    wherein the projection and the support walls are formed on a support portion formed within the connecting element of the second holding device, and
    wherein the support portion includes a recessed portion formed thereon and facing the opening of the connecting element.

5. A connecting structure of a first holding device and a second holding device that are respectively configured to hold a first elongated member and a second elongated member,
    wherein the first holding device includes an anchor formed thereon and having a cylindrical shape,
    wherein the second holding device includes an insertion hole formed thereon and an engagement member formed thereon,
    wherein the insertion hole is configured to rotatably hold the anchor therein when the anchor is introduced thereinto, thereby forming a connected condition of the first holding device and the second holding device, and
    wherein the engagement member comprises a projection that is configured to enter the anchor in such a manner that an outer surface of the projection is positioned adjacent to an inner surface of the anchor in the connected condition of the first holding device and the second holding device.

6. The connecting structure as defined in claim 5, wherein the engagement member comprises support walls that are configured to be positioned adjacent to an outer surface of the anchor in the connected condition of the first holding device and the second holding device.

7. The connecting structure as defined in claim 6, wherein the first holding device includes a connecting element on which the anchor is formed, and
    wherein the second holding device includes a connecting element on which the insertion hole, the projection and support walls are formed.

8. A connecting structure of a first holding device and a second holding device that are respectively configured to hold a first elongated member and a second elongated member,
    wherein the first holding device includes a cylindrical anchor fanned thereon and having an engagement claw,
    wherein the second holding device includes an insertion hole formed thereon and configured such that the anchor is introduced thereinto and the engagement claw engages a circumferential periphery thereof,
    wherein the first holding device and the second holding device are configured to be rotated relative to each other about an axis of the anchor in a connected condition of the first holding device and the second holding device in which the engagement claw of the anchor engages the circumferential periphery of the insertion hole,
    wherein the first holding device and the second holding device include a distortion prevention mechanism that is configured to prevent the anchor from being distorted in the connected condition of the first holding device and the second holding device, wherein the distortion prevention mechanism includes a pair of support walls formed on the second holding device, and wherein the pair of support walls are configured to be positioned adjacent to an outer circumferential surface of the anchor in the connected condition of the first holding device and the second holding device.

9. The connecting structure as defined in claim 8, wherein the pair of support walls are configured to be oppositely positioned across the anchor in the connected condition of the first holding device and the second holding device.

* * * * *